(12) United States Patent
Onderko et al.

(10) Patent No.: US 7,891,448 B2
(45) Date of Patent: Feb. 22, 2011

(54) OVERRIDE CONTROL CIRCUITS FOR A LAWN AND GARDEN TRACTOR

(75) Inventors: Joseph M. Onderko, Copley, OH (US); Michael W. Miller, Brunswick, OH (US); Scott C. Bly, Olmstead Falls, OH (US); Theodore G. Wetzel, Mayfield, OH (US)

(73) Assignees: MTD Products Inc, Valley City, OH (US); Delta Systems, Inc., Streetsboro, OH (US)

( * ) Notice: Subject to any disclaimer, the term of this patent is extended or adjusted under 35 U.S.C. 154(b) by 527 days.

(21) Appl. No.: 11/662,685

(22) PCT Filed: Sep. 30, 2005

(86) PCT No.: PCT/US2005/035239
§ 371 (c)(1),
(2), (4) Date: Apr. 8, 2008

(87) PCT Pub. No.: WO2006/039521
PCT Pub. Date: Apr. 13, 2006

(65) Prior Publication Data
US 2008/0257631 A1 Oct. 23, 2008

Related U.S. Application Data

(60) Provisional application No. 60/614,934, filed on Sep. 30, 2004.

(51) Int. Cl.
B60K 25/06 (2006.01)
(52) U.S. Cl. .................. 180/53.1; 180/53.6; 180/53.62
(58) Field of Classification Search ................ 180/53.6, 180/53.62, 53.1
See application file for complete search history.

(56) References Cited

U.S. PATENT DOCUMENTS

| 3,229,452 | A | 1/1966 | Hasenbank |
| 3,999,643 | A | 12/1976 | Jones |
| 5,203,440 | A | 4/1993 | Peterson, Jr. et al. |
| 5,314,038 | A | 5/1994 | Peterson, Jr. |
| 5,327,019 | A | 7/1994 | Kluck |

(Continued)

FOREIGN PATENT DOCUMENTS

| EP | 389 556 A1 | 2/2004 |
| EP | 1389556 A1 | 2/2004 |

*Primary Examiner*—Paul N Dickson
*Assistant Examiner*—Nicole Verley
(74) *Attorney, Agent, or Firm*—Wegman, Hessler & Vanderburg

(57) ABSTRACT

Control circuits for a riding lawn mower providing an override condition for selectively allowing the cutting blades of the lawn mower to operate when the vehicle is traveling in reverse. The circuits incorporate a multi-position ignition switch, an override switch, a vehicle reverse switch, a PTO switch and a park brake switch. In one aspect of the invention, the control circuits disable the engine when the vehicle is placed in reverse with the PTO engaged and without the override condition having been established. In another aspect of the invention, an electric PTO clutch is disabled when the vehicle is placed in reverse with the PTO engaged and without the override condition having been established. The override condition is terminated when the ignition switch is moved away from the override position, or when the operator activates the park brake switch.

9 Claims, 4 Drawing Sheets

U.S. PATENT DOCUMENTS

| | | |
|---|---|---|
| 5,616,964 A | 4/1997 | Peterson, Jr. |
| 5,994,857 A * | 11/1999 | Peterson et al. ............. 318/282 |
| 6,026,634 A | 2/2000 | Peter et al. |
| 6,109,010 A * | 8/2000 | Heal et al. .................... 56/10.8 |
| 6,237,311 B1 | 5/2001 | Richards |
| 6,316,891 B1 | 11/2001 | Hough |
| 6,405,513 B1 | 6/2002 | Hancock et al. |
| 6,437,458 B1 * | 8/2002 | Baggett ...................... 307/9.1 |
| 6,513,310 B1 * | 2/2003 | Hancock et al. .......... 56/10.2 R |
| 6,568,162 B2 | 5/2003 | Walters |
| 6,591,594 B2 | 7/2003 | Hancock et al. |
| 6,609,357 B1 | 8/2003 | Davis et al. |
| 6,720,679 B2 | 4/2004 | Harada et al. |
| 6,758,292 B2 * | 7/2004 | Shoemaker ................. 180/53.6 |
| 7,128,177 B2 * | 10/2006 | Harvey et al. ............... 180/53.6 |
| 7,131,509 B2 * | 11/2006 | Harvey et al. ............... 180/53.6 |
| 7,237,633 B2 * | 7/2007 | Straka et al. ................ 180/53.6 |
| 7,523,796 B2 * | 4/2009 | Onderko et al. ............. 180/53.6 |
| 2003/0056480 A1 | 3/2003 | Johnson |
| 2004/0026138 A1 | 2/2004 | Shoemaker |
| 2004/0026150 A1 | 2/2004 | Nishi et al. |
| 2004/0124026 A1 | 7/2004 | Walters et al. |
| 2004/0201286 A1 | 10/2004 | Harvey et al. |

* cited by examiner

US 7,891,448 B2

OVERRIDE CONTROL CIRCUITS FOR A LAWN AND GARDEN TRACTOR

CROSS-REFERENCE TO RELATED APPLICATION

This application claims the priority benefit of U.S. Provisional Patent Application Ser. No. 60/614,934 filed Sep. 30, 2004.

BACKGROUND OF THE INVENTION

1. Field of Invention

The present invention relates generally to electrical control circuits for a lawn and garden tractor or similar vehicle having a controllable power-take-off (PTO) system, and more particularly relates to an override system for selectively allowing the PTO to operate when the vehicle is traveling in reverse.

2. Description of Related Art

Lawn tractors, mowing machines, and similar lawn and garden type vehicles such as utility vehicles, snow blowers, sweepers, and leaf blowers having PTO driven attachments are well known. Such machines typically include a magneto operated internal combustion (IC) engine for driving the machine and a controllable power-take-off (PTO) for transferring power to an attachment or implement, such as the cutting unit of a lawn and garden tractor. However, it is understood that electric and/or hybrid-type engines could also be used to power such machines.

Under certain conditions, it is desirable to operate the PTO while the vehicle is traveling in reverse. Various override systems have been proposed for this purpose, but many are inconvenient or difficult to operate. Providing an override system that is convenient, safe, reliable, and relatively simple to incorporate into existing engine control circuitry has been heretofore difficult to achieve.

SUMMARY OF THE INVENTION

The present invention provides an improved override control system and method for controlling a lawn and garden tractor or similar vehicle having a controllable power-take-off (PTO) drive for transferring power to an attachment or cutting implement when the vehicle is operating in a reverse direction. The invention provides an override control system which does not require the operator to reset the override condition each time reverse operation is selected, and does not require the operator to reset the override condition each time the PTO drive is disengaged. The override condition is released when the operator activates the vehicle parking brake or when the operator turns the ignition switch away from the override position. The override system is adaptable to both manual and electric PTO systems.

The control circuits are responsive to input from a key actuated ignition switch, a manually activated override switch, a PTO switch, and a vehicle park brake switch. The control circuits provide a non-override condition when the ignition switch is in a non-override position for preventing operation of the power-take-off when the vehicle is operating in the reverse direction. The control circuits provide an override condition when the park brake switch is in the off position, and when the ignition switch is in an override position when the override switch is activated, wherein the override condition allows operation of the power-take-off when the vehicle is operating in the reverse direction. In this way, a dual actuation of the ignition switch and override switch is required to set the override condition. The override condition is maintained when the vehicle transitions between the forward and reverse directions, and when the PTO switch transitions between the engaged and disengaged positions. The override condition is released when the park brake switch is placed in the on position, or when the ignition switch is moved away from the override position.

In one aspect of the invention, if the vehicle is placed in reverse with the PTO engaged and without the override condition having been established, the engine of the vehicle will become disabled. In another aspect of the invention, the PTO of the vehicle, not the engine, will become disabled when the vehicle is placed in reverse with the PTO engaged and without the override condition having been established. In the exemplary embodiments, once the override condition is established, the override condition is maintained when the vehicle transitions between reverse and forward operation direction, allowing the vehicle to be repeatedly shifted back and forth between forward and reverse without interrupting the override condition. In addition, the override condition is maintained if the PTO is disengaged subsequent to the override condition having been established.

In the present invention, the operator must place the ignition switch into a predetermined override position before the override condition may be established. Once the override condition has been established, the override condition will be released if the operator activates the vehicle parking brake, or if the operator moves the ignition switch away from the predetermined override position.

These and other objects, features, and advantages of the present invention will become apparent to one skilled in the art upon examination and analysis of the following detailed description in view of the drawings.

DETAILED DESCRIPTION OF EXEMPLARY EMBODIMENTS

Figure 1:
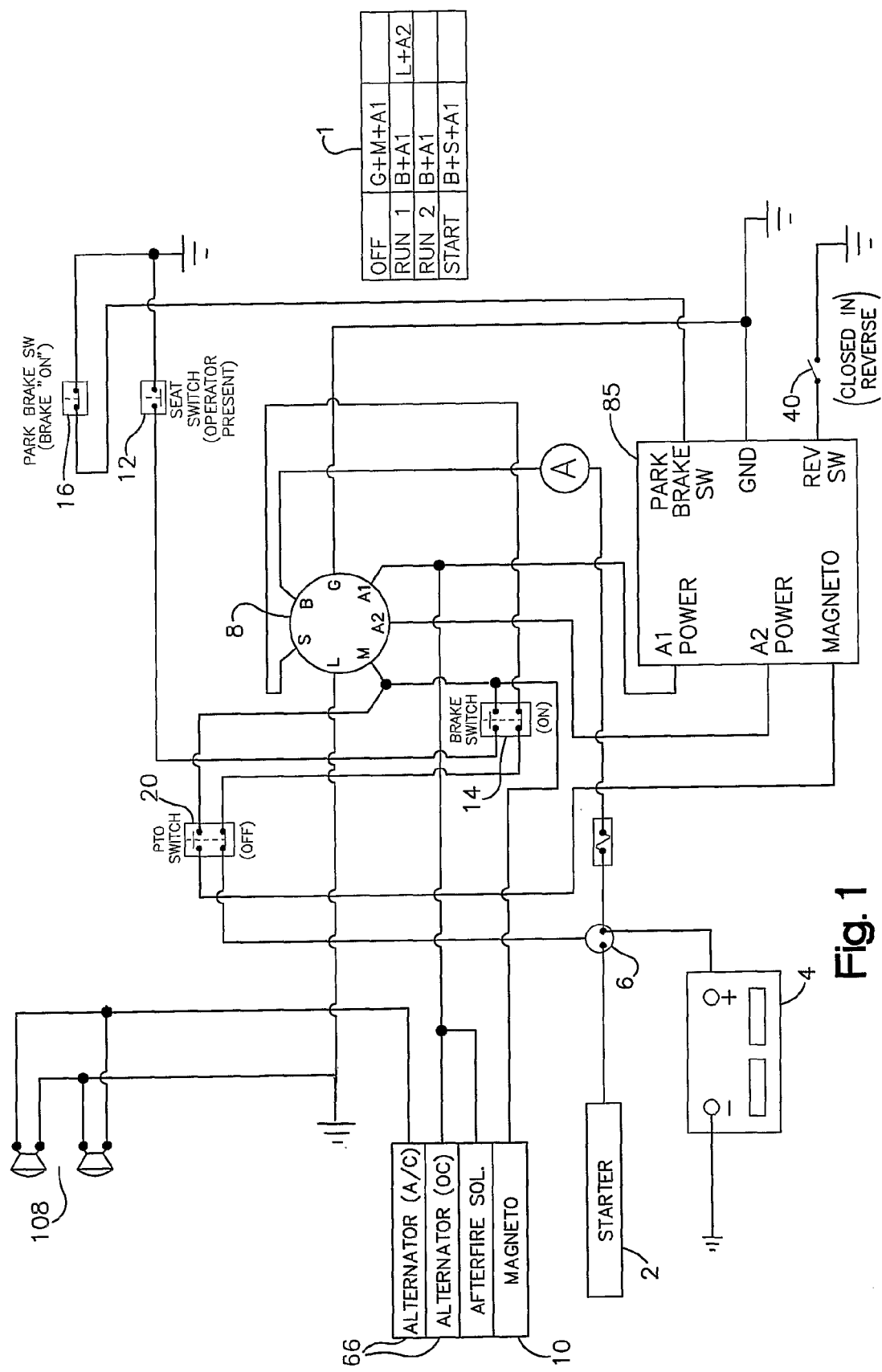
FIG. 1 is a circuit schematic illustrating a manual PTO override circuit in accordance with an exemplary embodiment of the present invention.
Figure 2:
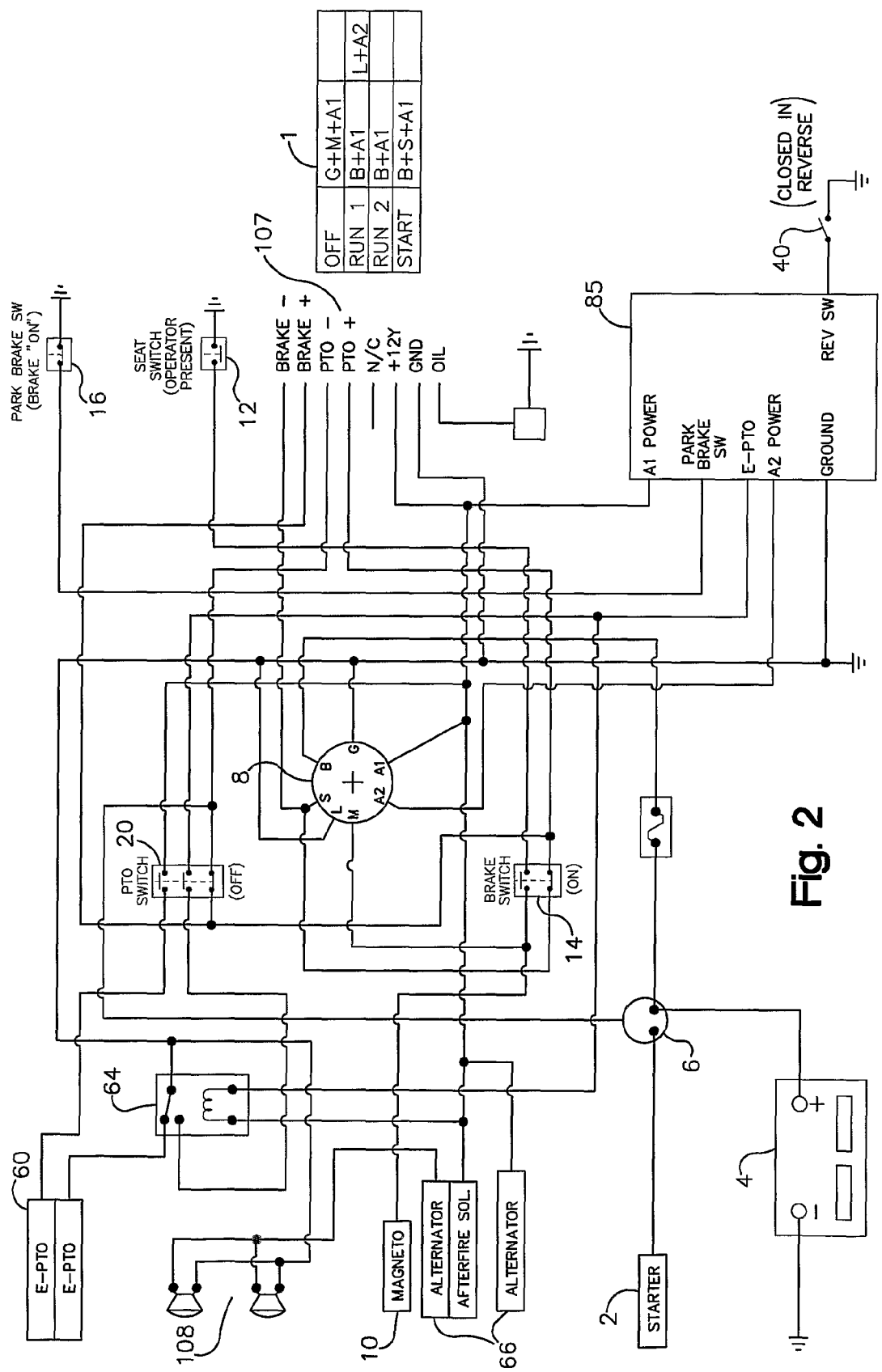
FIG. 2 is a circuit schematic illustrating an electric PTO override circuit in accordance with another exemplary embodiment of the present invention.

Referring to the drawings, wherein like numerals represent like parts throughout, FIGS. 1 and 2 depict a set of override control circuits in accordance with alternative embodiments of the present invention. Each circuit is comprised of readily available components. Although the circuits are similar is many respects, important differences between the circuits are noted where such differences are important for understanding the scope of the present invention. For example, FIG. 1 includes a two pole PTO switch 20, whereas FIG. 2 includes a three pole PTO switch 20. These and other features are readily understood by one of ordinary skill in the art and will not be explained in detail if its value is not critical for understanding the nature of the present invention.

FIGS. 1 and 2 illustrate a pair of override control circuits adapted for use with a riding lawn mowing vehicle having a conventional magneto operated internal combustion engine (not shown). However, it is understood that the control circuits could be adapted for use with vehicles having electric and/or hybrid-type engines without departing from the broader scope and spirit of the present invention. As shown, the circuits incorporate a multi-position key actuated ignition switch 8 having an input terminal B connected to a source of electrical power, such as battery 4. In the present embodiments, the ignition switch 8 includes an OFF position, a RUN1 position, a RUN2 position, and a START position. As shown in table 1, when the ignition switch is in the OFF position, contact is made between ignition switch terminals G (ground), M (magneto), and A1 (power). When the ignition switch 8 is in the START position, contact is made between ignition switch terminals B (battery), S (starter), and A1. When the ignition switch 8 is in the RUN1 position, contact is made between ignition switch terminals B (battery) and A1 (power), and between terminals L and A2. When the ignition switch is in the RUN2 position, contact is made between ignition switch terminals B (battery) and A1 (power). In the present embodiments, the RUN1 position is referred to as the override position and the RUN2 position is referred to as the non-override position. Accordingly, the ignition switch 8 must be placed in the RUN1 position in order to establish the override condition, although it is understood that alternative key switch configurations could be provided to achieve the same results. As discussed in more detail below, the circuit of FIG. 1 is referred to as a "manual PTO" circuit because it is adapted to ground the magneto 10 and disable the engine if reverse operation is selected when the PTO is engaged and without the override condition having been established. By comparison, the circuit of FIG. 2 is referred to as an "electric PTO" circuit because it is adapted to ground the PTO relay 64 and disable the electric PTO clutch 60 (not the engine) if reverse operation is selected when the PTO is engaged and without the override condition having been established. In each circuit, the PTO switch 20 is shown in the off position. The PTO switch 20 allows the operator to selectively activate and deactivate the vehicle power-take-off and associated implements (not shown) through the PTO switch.

With reference to FIG. 1, Table 1 shows that when the ignition switch is in the OFF position, contact is made between ignition switch terminals G (ground), M (magneto), and A1 (power). When the ignition switch 8 is in the START position, contact is made between ignition switch terminals B (battery), S (starter), and A1. When the ignition switch 8 is in the RUN1 position, contact is made between ignition switch terminals B (battery) and A1 (power), and between terminals L and A2. When the ignition switch is in the RUN2 position, contact is made between ignition switch terminals B (battery) and A1 (power).

When ignition switch 8 is in the OFF position, a complete circuit is provided via ignition switch terminals M and G, thereby connecting the magneto 10 to ground and preventing the engine from operating. When ignition switch 8 is moved to the START position, a complete circuit is provided between starter unit 2 and battery 4, so long as brake switch 14 is ON and PTO switch 20 is OFF. When ignition switch 8 is turned to the START position, a complete starter circuit is provided to energize solenoid 6 via battery 4, thereby actuating starter 2 and starting the engine. Once the engine is running, ignition switch 8, which may for example be spring loaded, is adapted to move automatically to the RUN2 position. Assuming the brake switch 14 is OFF and the engine is running when the operator leaves the operator seat (thereby disengaging seat switch 12), an uninterrupted current path is provided between the magneto 10 and ground via the upper pole of brake switch 14 and the seat switch 12, thereby disabling the engine.

With reference to FIG. 2, the electric PTO circuit includes a general purpose relay 64 and associated electric PTO clutch 60. In this embodiment, if the PTO switch and reverse switch 40 are ON, then a closed path is provided between battery 4 and ground, allowing a flow of current to energize relay 64, with results being that power to the electric PTO clutch 60 is interrupted and the PTO becomes disabled.

Figure 3:
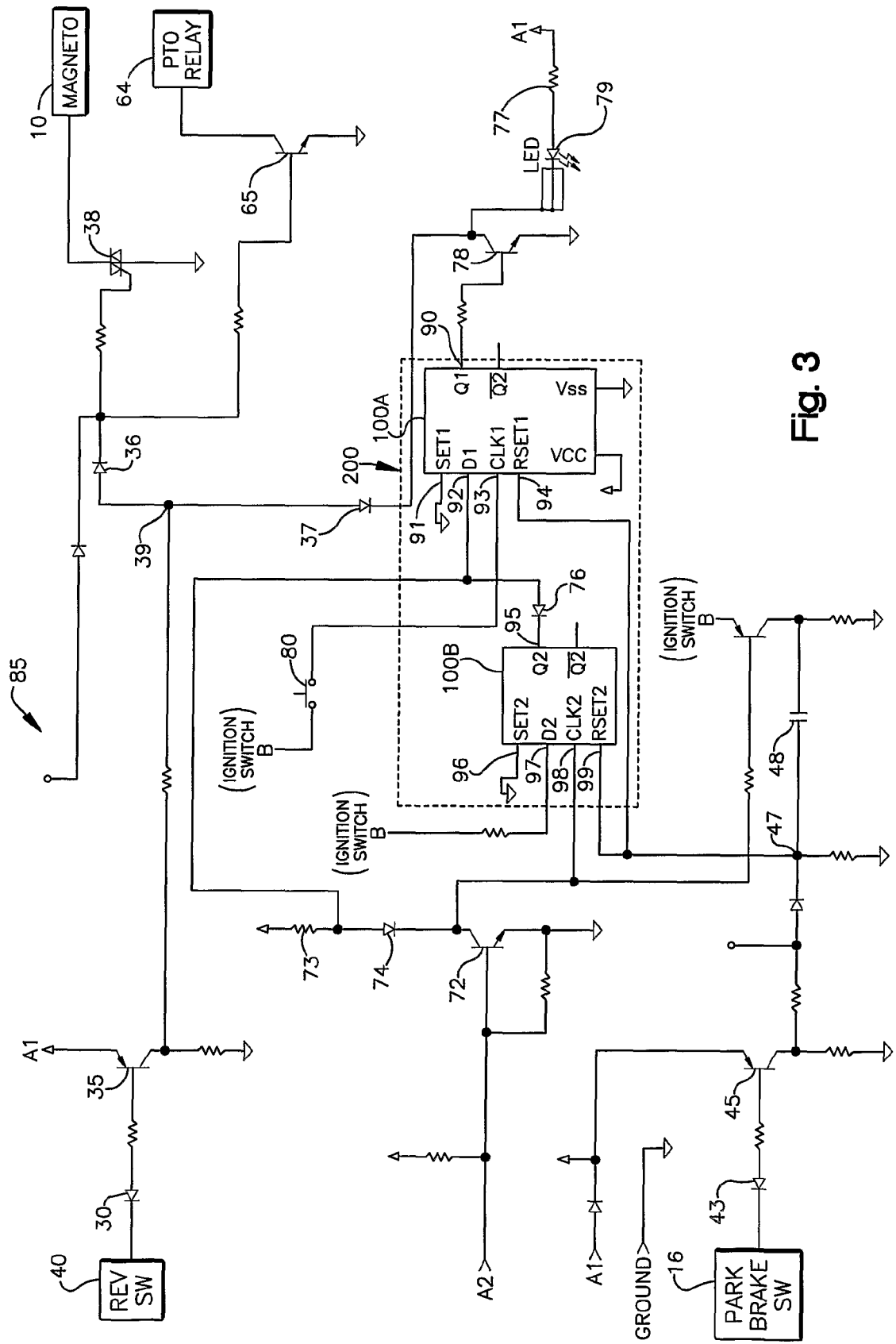
FIG. 3 is a detail view of an RMC (reverse mower control) module as generally depicted in FIGS. 1 and 2.

With reference to FIGS. 2 and 3, if the operator fails to activate the override switch 80 before putting the vehicle in reverse with the PTO engaged, relay 64 is grounded, thereby activating relay 64 and interrupting the power circuit for the electric PTO clutch 60 and disabling the PTO. Under these conditions, if the operator activates the override switch 80 after the reverse switch is closed, relay 64 remains activated due to a self-feeding current flowing through the closed middle pole of PTO switch 20, with results being that PTO operation remains disabled. In order to interrupt this self-feeding current path and deactivate relay 64, the operator must open the middle pole of PTO switch 20 by turning the PTO switch OFF. Once the PTO switch 20 has been turned OFF and relay 64 has been deactivated, PTO operation may be re-established when the vehicle is traveling in reverse once the operator turns the PTO switch ON.

As shown in FIG. 2, the electric PTO circuit further includes an array of electrical leads 107 which may be connected in a manner known in the art to a series of dashboard lights or monitors to notify the operator of the operational status of the respective components as shown.

The control circuits of FIGS. 1 and 2 further include a solid state RMC (reverse mower control) module 85. The basic construction and operation of the control module 85 will now be described with reference to FIG. 3.

Referring to FIG. 3, the basic construction of the control module 85 is achieved from readily available components, including a functional block 200 implemented using standard data-type flip-flops 100A and 100B, such as Part No. CD4013B CMOS Dual D-Type Flip-Flops, available from Texas Instruments. The functional block 200 includes Q1 output terminal 90 generated by data flip-flop 100A, and Q2 output terminal 95 generated by data flip-flop 100B. Q1 output terminal 90 is responsive to input from D1 data input 92, CLK1 input 93, SET1 input 91, and RSET1 input 94. Similarly, Q2 output terminal 95 is responsive to input from D2 data input 97, CLK2 input 98, SET2 input 96, and RSET2 input 99. Q1 output 90 is operatively coupled to the base of transistor 78. If data flip-flop 100A generates a high voltage signal at Q1 output 90, transistor 78 is turned on. On the other hand, if data flip-flop 100A generates a low voltage signal at Q1 output 90, transistor 78 is turned off. When transistor 78 is turned on, the cathode of LED 79 is effectively grounded, thereby providing an uninterrupted path for current to flow through LED 79 between terminal A1_PROT and ground, thereby turning LED 79 on. As described in more detail below, when LED 79 is turned on, the control circuit is said to be in an override condition. By comparison, when transistor 78 is turned off, an open circuit is provided between the collector of transistor 78 and the cathode of LED 79, thereby turning LED 79 off. When LED 79 is turned off, the control circuit is said to be in a non-override condition.

Inputs leading into flip-flop 100A are CLK1 clock input 93, D1 data input 92, SET1 input 91, and RSET1 input 94. CLK1 input 93 selectively receives positive output from the battery 4. Protected Battery power from ignition switch terminal A1 is controlled by override switch 80. When override switch 80 is closed, positive voltage from ignition switch terminal A1 (e.g., 15 V) is fed to CLK1 input 93. D1 data input 92 selectively receives output from battery 4 via ignition switch terminal A2, which in turn is controlled by the status of transistor 72. D1 data input 92 also receives input from Q2 output 95 of flip-flop 100B. If Q2 output 95 provides a high voltage value to the cathode of diode 76, then diode 76 becomes reverse biased, thereby isolating the high voltage value of Q2 output 95 from D1 data input 92 of flip-flop 100A. This means that when Q2 output 95 is high, D1 data input 92 receives output solely from switch terminal A2 and associated transistor 72.

Referring again to FIG. 3, inputs leading into the functional block 200 are selectively controlled by reverse switch 40, ignition switch terminal A2, park brake 16, and override switch 80. Depending on the status of these various control switches, Q1 output signal 90 of flip-flop 100A generates either a high voltage or low voltage value to the base of transistor 78. A high voltage value at the base of transistor 78 turns transistor 78 on, and a low voltage value turns transistor 78 off.

Input leading into transistor 72 is controlled by ignition switch terminals A1, A2. Suppose that ignition switch 8 is in the RUN2 position. This means that ignition switch terminal A2 is off (open). As a result, positive voltage from ignition switch terminal A1 is transferred to the base of transistor 72, thereby turning transistor 72 on. When transistor 72 is turned on, a voltage drop occurs across resistor 73 via terminal A1, thereby providing a low voltage value to the anode of diode 74. Such low voltage value at the anode of diode 74 is fed to D1 data input 92, which is then transferred to Q1 output 90 during the positive going transition of CLK1 input 93.

By comparison, suppose that ignition switch 8 is in the RUN1 position and ignition switch terminal A2 is closed (on). This means that ignition switch terminal A2 is on (closed to ground). As a result, the base of transistor 72 is pulled to ground, with results being that transistor 72 is turned off. When transistor 72 is turned off, positive voltage from the key switch A1 terminal provides a high voltage signal to the collector side of transistor 72. Such high voltage value at the collector of transistor 72 is fed to D1 data input 92, which is then transferred to Q1 output 90 during the positive going transition of CLK1 input 93 when the override switch 80 is activated.

As shown in FIG. 3, CLK1 input 93 of data flip-flop 100A selectively receives power from ignition switch terminal A1, depending on the status of override switch 80. Assuming that override switch 80 is open (not activated), output from ignition switch terminal A1 is isolated from CLK1 input 93, with results being that a low voltage value is fed to CLK1 input 93. If override switch 80 is activated (closed), positive voltage from ignition switch terminal A1 is fed to CLK1 input 93, thereby "clocking" data flip-flop 100A and transferring the logic level present at D1 data input 92 to Q1 output 90.

As described above, if ignition switch 8 is in the RUN1 (i.e. override) position, a high voltage value is provided to D1 data input 92. Under these circumstances, if override switch 80 is activated (closed), data flip-flop 100A is clocked and the high voltage value present at D1 data input 92 is transferred to Q1 output 90. Such high voltage value at Q1 output 90 is then fed to the base of transistor 78, thereby turning transistor 78 on. When transistor 78 is turned on, an uninterrupted current path is provided between ignition switch terminal A1 and ground via resistor 77, LED 79 and transistor 78. In this way, LED 79 becomes energized, thereby signaling to the operator that the override condition has been established.

One characteristic of the present invention is the ability of the control module to provide an override condition wherein the engine magneto 10 (manual PTO embodiment) or PTO relay 64 (electric PTO embodiment) remain isolated from ground when the reverse switch 40 is closed. In this way, PTO operation is permitted when reverse operation is selected. As shown in FIG. 3, the engine magneto 10 or PTO relay 64 remain isolated from ground so long as a low voltage value is provided to the gate of triac 38. If a high voltage value is present at node 39, triac 38 is activated and magneto 10 is grounded. Similarly, if a high voltage value is present at node 39, transistor 65 is turned on and relay 64 is grounded. PTO operation is disabled when the magneto 10 or PTO relay 64 are grounded.

Referring again to FIG. 3, suppose that transistor 78 is off. If reverse operation is selected (i.e., reverse switch 40 is closed), diode 36 is forward biased and a high voltage signal is presented at node 39. Accordingly, such high voltage value at node 39 is effective to activate triac 38 and ground the magneto 10 (manual PTO embodiment) or to activate transistor 65 and ground the PTO relay 64 (electric PTO embodiment), with results being that PTO operation is disabled.

Suppose that reverse switch 40 is closed (in reverse). The cathode of diode 30 is grounded, thereby allowing current to flow between ignition switch terminal A1 and ground. This means that a low voltage value is provided to the base of transistor 35, thereby turning transistor 35 on. When transistor 35 is on, a high voltage value is provided to the collector of transistor 35, which is then fed as a high voltage value to node 39. Assuming that transistor 78 is turned off (i.e., Q1 output 90 is low) when a high voltage value is fed from the collector of transistor 35 to node 39, diode 36 becomes forward biased and triac 38 is activated, thereby grounding the magneto 10 or PTO relay 64 and subsequently disengaging PTO operation.

By comparison, suppose that reverse switch 40 is open (i.e., forward position). If reverse switch 40 is open, a relatively high voltage value is provided to the base of transistor 35, thereby turning transistor 35 off. When transistor 35 is turned off, a low voltage value is provided to the collector side of transistor 35, which is then fed as a low voltage value to node 39. A low voltage value at node 39 means that triac 38 is not activated, effectively isolating the magneto or PTO relay from ground, thereby permitting PTO operation. Under these circumstances, if transistor 78 is turned on, (i.e., override switch 80 is activated), a low resistance current path is provided between node 39 and ground via diode 37 and transistor 78, thereby allowing current to flow from node 39 to ground via transistor 78. When current is interrupted through triac 38, the triac 38 is turned off and the magneto is not grounded. As shown in FIG. 3, LED 79 is activated when transistor 78 is turned on, thereby signaling to the operator that the override condition has been established.

A reset function for the control module will now be described. As best shown in FIG. 3, a low voltage value is provided at node 47 when park brake switch 16 is open (i.e., park brake off). When the park brake is off, a low voltage value is fed to RSET inputs 94, 99 of flip-flops 100A and 100B, with results being that Q1, Q2 output terminals 90, 95 are not reset. By comparison, if park brake switch 16 is closed (i.e., park brake on), the cathode of diode 43 is grounded, which means that a low voltage value is provided to the base of transistor 45, thereby turning transistor 45 on. When transistor 45 is turned on, a high voltage value is asserted to node 47, which is then fed to RSET inputs 94, 99, thereby resetting Q1, Q2 output terminals 90, 95 to logic low values. A low voltage value at Q1 output 90 is fed to the base of transistor 78, thereby turning transistor 78 off and releasing the override condition when the operator actuates the park brake 16. As shown in FIG. 3, the override condition is also reset if the operator turns the ignition switch away from the RUN1 override position.

Once the override condition has been reset, the PTO will become disabled if reverse operation is selected without the override condition having been established. In order to re-establish the override condition, the ignition switch must be placed in the RUN1 position. As described above, when ignition switch 8 is placed in the RUN1 position, a positive going transition at CLK2 input 98 "clocks" data flip-flop 100B, thereby transferring the fixed high voltage value asserted at D2 data input 97 via ignition switch terminal A1 to Q2 output 95. Such high voltage value at Q2 output 95 serves to reverse bias diode 76 and isolate Q2 output 95 from D1 data input 92 as described above. A high voltage value is asserted at D1 data input 92 when ignition switch is in the RUN1 (override) position and when diode 76 is reverse biased. Accordingly, transistor 78 will be activated and the override condition will be established once data flip-flop 100A is clocked by activating the override switch 80.

Figure 4:
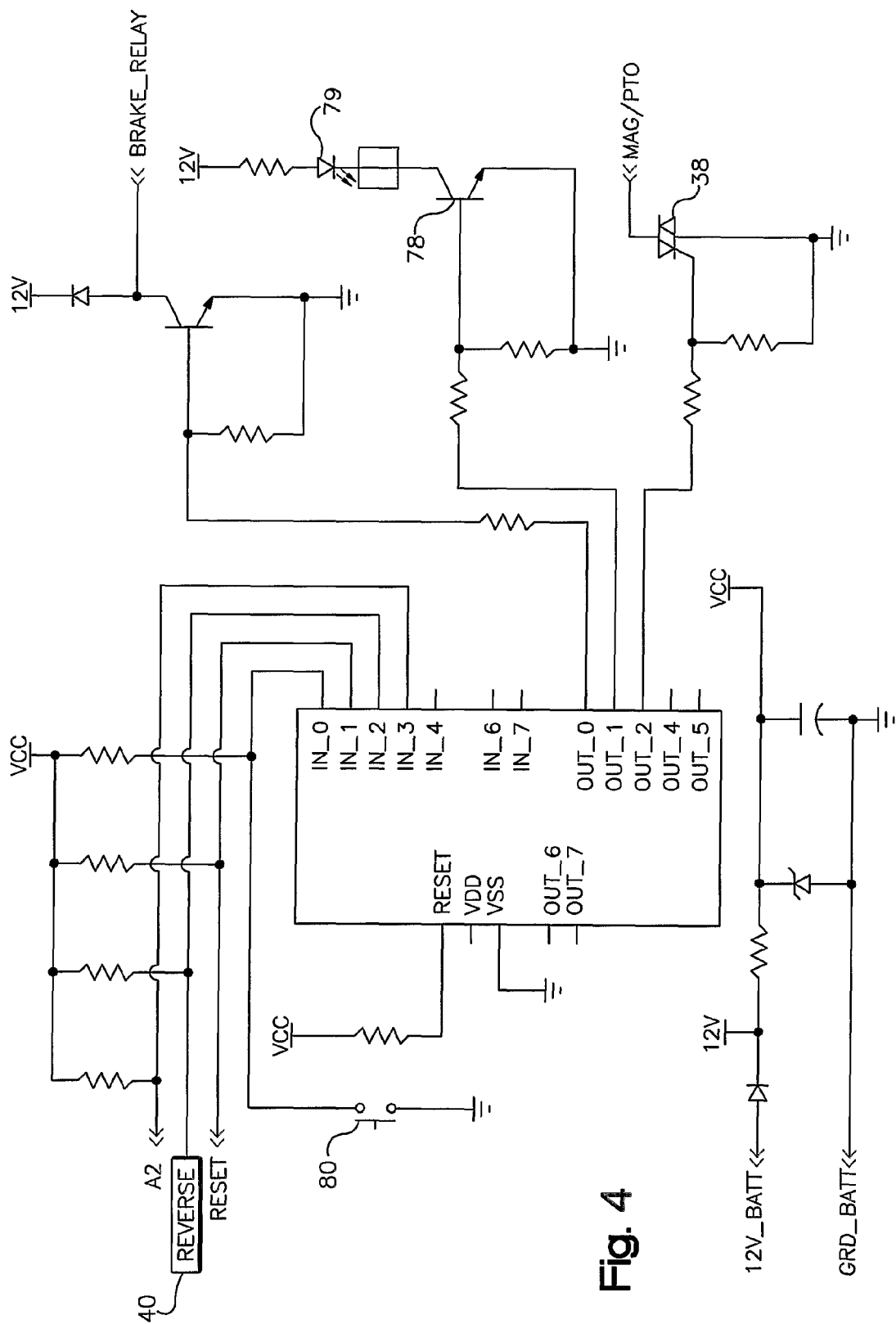
FIG. 4 is a partial schematic illustrating a microcontroller and associated circuitry in accordance with exemplary embodiments of the present invention.

Having described specific exemplary embodiments with reference to FIGS. 1-3, reference is now made to FIG. 4 which provides a generic schematic illustration of the general operation of the control circuits in accordance with the present invention. In general terms, FIG. 4 includes a programmable microcontroller 400 comprising means for sensing reverse vehicle operation via reverse switch 40, and means for sensing ignition switch terminal A2 and override switch 80 for purposes of interacting with transistor 78, triac 38, and brake relay 16 to selectively disengage (i.e., ground) the engine magneto 10 or electric PTO 64 via triac 38 when reverse operation is selected except if the override condition is established as described above. Similar to the operation of the control circuits of FIG. 3, the LED 79 of FIG. 4 becomes energized when transistor 78 is turned on, thereby signaling the operator that the override condition has been established and allowing operation of the vehicle and/or power-take-off when reverse operation is selected. By comparison, if reverse operation is selected without activation of the override switch 80 and ignition switch terminal A2, the engine magneto 10 or electric PTO clutch 64 will be grounded via triac 38, with results being that PTO operation is disabled.

In each of the control circuits of the present invention there is no requirement for the operator to actuate the override condition each time the vehicle is put into reverse in order to facilitate mowing in reverse. Rather, once the override switch is engaged and the override condition is achieved, the vehicle can be repeatedly shifted back and forth between forward and reverse without disabling the PTO. In each of the control circuits the override condition is also independent of the status of the PTO switch. This means that once the override switch 80 is activated, the operator can repeatedly move the PTO switch between the ON and OFF positions without affecting or interrupting the override condition. In other words, the override condition is maintained even if the operator desires to temporarily turn the PTO OFF (for example when crossing a road or driveway). PTO operation can be subsequently restored by simply turning the PTO switch ON, without having to re-set or reactivate the override condition.

In the present embodiments of the invention, the override condition is released when the operator actuates the vehicle parking brake, or when the ignition switch is moved away from the override position.

In the foregoing specification, the invention has been described with reference to specific exemplary embodiments thereof. It will, however, be evident that various modifications and changes may be made thereunto without departing from the broader spirit and scope of the invention therein. For example, although the present invention has been generally illustrated with reference to discrete electrical, electro-mechanical, and/or microcontroller-based component systems, many other known or later developed electrical, electro-mechanical, microprocessor and/or software-based control systems could be used to achieve the same results. As such, it is understood that even though numerous characteristics and advantages of the present invention have been disclosed, other modifications and alterations are within the knowledge of those skilled in the art without undue experimentation and are to be included within the broader scope of the appended claims.

What is claimed is:

1. A control circuit for controlling a power-take-off of a lawn and garden vehicle, said control circuit comprising:
    a multi-position ignition switch having at least a first position and a second position;
    a PTO switch having an engaged position and a disengaged position;
    a reverse switch having a forward position and a reverse position for selectively operating said vehicle in a forward or a reverse direction;
    a park brake switch having an on position and an off position;
    an override switch having an activation position and a non-activation position;
    said control circuit providing a non-override condition when said ignition switch is in said second position, said non-override condition preventing operation of said power-take-off when said vehicle is operating in said reverse direction;
    said control circuit providing an override condition when said park brake switch is in said off position and said ignition switch is in said first position when said override switch is placed in said activation position, said override condition allowing operation of said power-take-off when said vehicle is operating in said reverse direction;
    wherein said override condition is released when said park brake switch is placed in said on position
    wherein said override condition is maintained when said vehicle transitions between said forward and reverse directions, and when said PTO switch transitions between said engaged and disengaged positions.

2. The control circuit of claim 1, wherein said override condition is released when said ignition switch is moved away from said first position.

3. The control circuit as recited in claim 2, wherein said override switch is a momentary switch having a momentary activation position, and wherein said override condition is maintained when said override switch transitions between said activation and non-activation positions.

4. The control circuit as recited in claim 3, wherein said multi-position ignition switch is a key actuated multi-position ignition switch.

5. The control circuit as recited in claim 4, wherein said vehicle includes an electric PTO clutch connected to said PTO switch for selectively engaging and disengaging said power-take-off.

6. The control circuit as recited in claim 5, further comprising means for disengaging said electric PTO clutch when said PTO switch is in said engaged position if said override condition is established subsequent to said reverse switch having been placed in said reverse position, said PTO clutch being re-engaged once said PTO switch has been switched from said engaged position to said disengaged position and then back to said engaged position.

7. The control circuit as recited in claim 1, wherein said vehicle includes a magneto connected to said PTO switch and said reverse switch, said magneto being grounded so as to disable an engine when said PTO switch is in said engaged position and said vehicle is operating in said reverse direction when said control circuit is in said non-override condition.

8. A control arrangement for an engine driven lawn mower having a motive drive arrangement operatively connected to the engine for selectively propelling the lawn mower in a forward direction and a reverse direction, and an operable lawn mowing mechanism for cutting vegetation, the control arrangement selectively preventing operation of the lawn mowing mechanism when the lawn mower is operating in the reverse direction, the control arrangement including:

means for sensing operation of the lawn mowing mechanism;

means for sensing selection of the motive drive arrangement to propel the lawn mower in the reverse direction;

means for receiving an override input from a lawn mower operator indicative of the desire to operate the lawn mowing mechanism while the mower is propelled in the reverse direction as an override mode;

means for sensing actuation of a vehicle park brake switch; and means for causing the control arrangement to selectively terminate operation of the lawn mowing mechanism, the means for causing being responsive to the means for sensing operation, the means for sensing selection, and the means for receiving such that the operation of the lawn mowing mechanism is terminated when the lawn mowing mechanism is operating and the motive drive arrangement is selected to propel the lawn mower in reverse except when the override mode is established via the means for receiving, the means for causing including means for terminating the override mode responsive to the means for sensing actuation of the vehicle park brake switch wherein said override mode is maintained when said lawn mower transitions between said forward and reverse directions, and when said lawn mowing mechanism transitions between operating and not operating.

9. The control arrangement of claim 8, wherein the means for causing is adapted to terminate operation of the lawn mowing mechanism by terminating operation of the engine when the lawn mowing mechanism is operating and the motive drive arrangement is selected to propel the lawn mower in reverse except when the override mode is established.

* * * * *